United States Patent [19]

Horie

[11] Patent Number: 5,544,136
[45] Date of Patent: Aug. 6, 1996

[54] DIGITAL SERVO SYSTEM FOR OBTAINING BY CALCULATION A CONTROL SIGNAL CORRESPONDING TO A DESIRED VALUE ON THE BASIS OF THE CHANGE OF A CONTROL SIGNAL AND A CONTROLLED SIGNAL

[75] Inventor: Yuji Horie, Hachioji, Japan

[73] Assignee: Olympus Optical Co., Ltd., Tokyo, Japan

[21] Appl. No.: 4,167

[22] Filed: Jan. 11, 1993

Related U.S. Application Data

[63] Continuation of Ser. No. 598,079, Oct. 16, 1990, abandoned.

[30] Foreign Application Priority Data

Oct. 23, 1989 [JP] Japan ................................. 1-276650

[51] Int. Cl.⁶ ..................................................... G11B 7/00
[52] U.S. Cl. .................................. 369/44.34; 369/44.29; 369/116
[58] Field of Search .......................... 369/44.11, 44.34, 369/44.35, 44.36, 44.28, 44.29, 116; 360/78.04, 78.11, 77.03

[56] References Cited

U.S. PATENT DOCUMENTS 4,942,564  7/1990  Hofer et al. .................... 369/44.11
5,048,002  9/1991  Horie et al. .................... 369/44.36
5,084,848  1/1992  Deguchi et al. ................. 369/44.35

FOREIGN PATENT DOCUMENTS 0247829  10/1987  European Pat. Off. .
63106003  5/1988  Japan .

Primary Examiner—Nabil Z. Hindi
Attorney, Agent, or Firm—Kenyon & Kenyon

[57] ABSTRACT

A tracking servo system for controlling the positional difference between a recording track of an optical disk and a light beam emitted on the track, in which the amount of offset control applied to an offset adjusting amplifier provided in the servo loop is varied and the center value of the positive and negative peak values of a track error signal obtained at that time is computed. Then, the relation between the amount of offset control and the center value of the peak values of the track error signal is determined and the amount of offset control corresponding to the desired center value of the peak values of the track error signal is obtained on the basis of the determined relation. Further, a laser beam emission power adjusting system used for recording and/or reproducing in an optical disk apparatus is disclosed, in which the laser beam emission adjusting output is varied and the amount of beam emission power obtained at that time is detected. Then, the relation between the laser beam emission adjusting output and the amount of beam emission power is determined and the value of the laser beam emission adjusting output corresponding to the desired amount of beam emission power is obtained on the basis of the determined relation.

10 Claims, 8 Drawing Sheets

DIGITAL SERVO SYSTEM FOR OBTAINING BY CALCULATION A CONTROL SIGNAL CORRESPONDING TO A DESIRED VALUE ON THE BASIS OF THE CHANGE OF A CONTROL SIGNAL AND A CONTROLLED SIGNAL

This a continuation of application Ser. No. 07/598,079 filed on Oct. 16, 1990, now abandoned.

BACKGROUND OF THE INVENTION

1. Field of the Invention

This invention relates to a digital servo system applied for, but not limited to, the tracking servo or the beam emission power control of the semiconductor laser in an optical recording and/or reproducing apparatus.

2. Description of the Related Art

An optical information recording and/or reproducing apparatus, such as an optical file apparatus, a magneto-optical disk apparatus and the like, is provided with a tracking servo system for making the spot of a light beam follow a recording track accurately and a focus servo system for always focusing the light beam on a recording surface.

These servo systems employ the feedback loop control in the field of automatic control, and the feedback loop control is used not only in the field of optical recording and/or reproducing apparatus, but also widely in other fields such as antennas, ships and the like.

Japanese Laid-Open Patent Application, Publication No. 63-106003 discloses a tracking servo system and a focus servo system in an optical information recording and/or reproducing apparatus, in which the P-P (peak to peak) value (the difference between the positive and negative peak values) of the track error signal as the amount of deviation of the light spot from the recording track or of the focus error signal as the amount of deviation of the focusing point of the light spot from the recording surface is measured, the level difference between the measured value and the preset reference P-P value is obtained, and an optimum gain constant is outputted to an amplifier in the servo loop from a ROM (read-only memory) which stores the optimum gain constants corresponding to the level differences, so that the loop gain in the servo system is kept optimum.

In the above-mentioned conventional system, however, the capacity of the ROM must be large because the amounts of change of the controlled signal (the gain constants) corresponding to the respective amounts of change of the control signal (the level difference between the detected P-P values and the reference P-P values) are stored in the ROM. Further, the higher the resolution of the analog-to-digital and digital-to-analog converters is, the larger the capacity of the ROM becomes.

Moreover, while the above-mentioned conventional system uses a predetermined relation between the amount of change of the control signal and the amount of change of the controlled signal, the controlled portions may have some variation. When this variation is large, the above-mentioned relation will not hold and the amount of change of the controlled portion is not always appropriate.

In order to solve this problem, it is necessary to limit the variation of the controlled portions to a certain range, thus to adjust the controlled portions. Alternatively, it is necessary to vary the stored data from system to system, which costs time and labor.

Furthermore, if the controlled signal has temperature characteristics, it is necessary to store the data for each temperature, which results in the expansion of the memory.

Additionally, if there is secular variation, the real relation will deviate from the stored relation. When the secular variation is large, the stored relation may not hold if worst comes to worst.

As stated above, the control method by storing the control and controlled signals beforehand cannot necessarily provide an efficient control.

SUMMARY OF THE INVENTION

An object of the present invention is to provide a digital servo system in which no memory of a large capacity is necessary in contrast to conventional systems.

Another object of the present invention is to provide a digital servo system which can cancel the variation, temperature characteristics, secular variation, etc., of the controlled signal and make a fast and stable control.

In order to attain these objects, a digital servo system according to the present invention comprises a controlled portion to be controlled by a control signal, the controlled portion outputting a controlled signal; an analog-to-digital converting portion for effectuating analog-to-digital conversion of the controlled signal; an operating portion for receiving the controlled signal from the analog-to-digital converting portion, determining and storing a relation between the control signal and the controlled signal, and outputting the control signal on the basis of the relation; and a digital-to-analog converting portion for effectuating digital-to-analog conversion of the control signal from the operating portion and outputting the converted control signal to the controlled portion.

In the above digital servo system, the operating portion outputs a control signal to the controlled portion via the digital-to-analog converting portion. The controlled portion outputs a controlled signal to the operating portion via the analog-to-digital converting portion. The operating portion determines and stores a relation between the control signal and the controlled signal. When another controlled signal is subsequently inputted to the operating portion, the operating portion produces another control signal on the basis of the stored relation between the control signal and the controlled signal and outputs it to the controlled portion via the digital-to-analog converting portion.

DETAILED DESCRIPTION OF THE PREFERRED EMBODIMENTS

Figure 1:
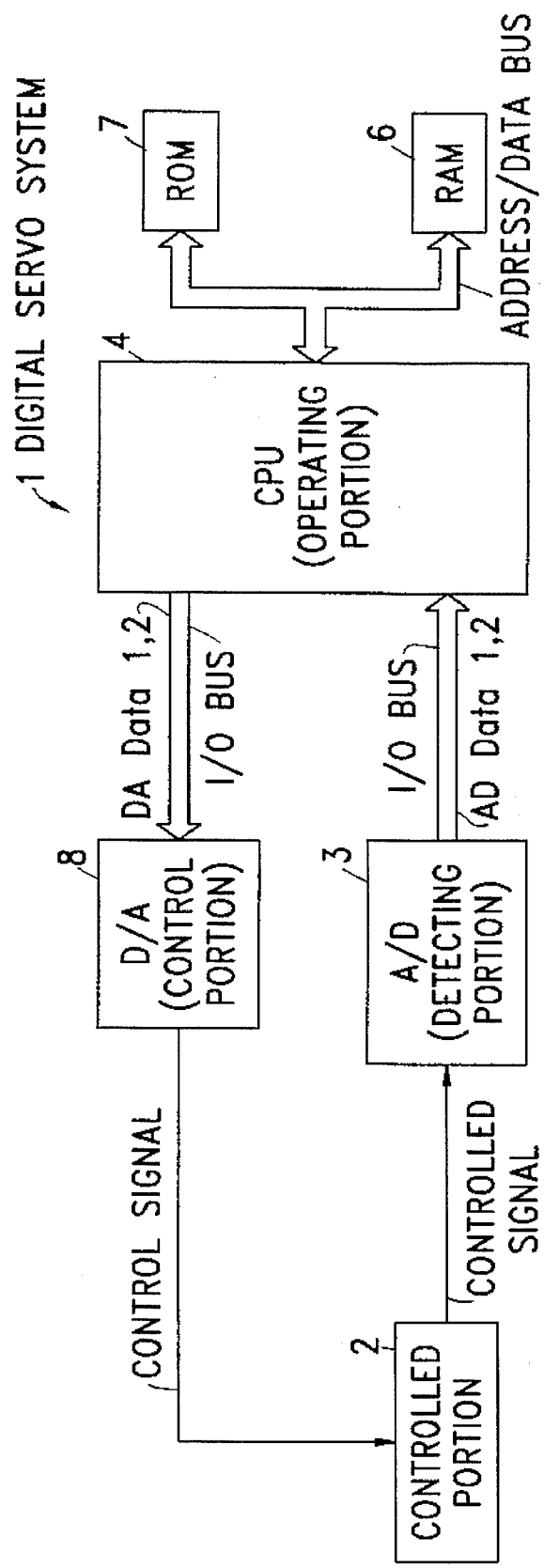
FIG. 1 is a block diagram of a digital servo system according to the present invention.
Figure 2:
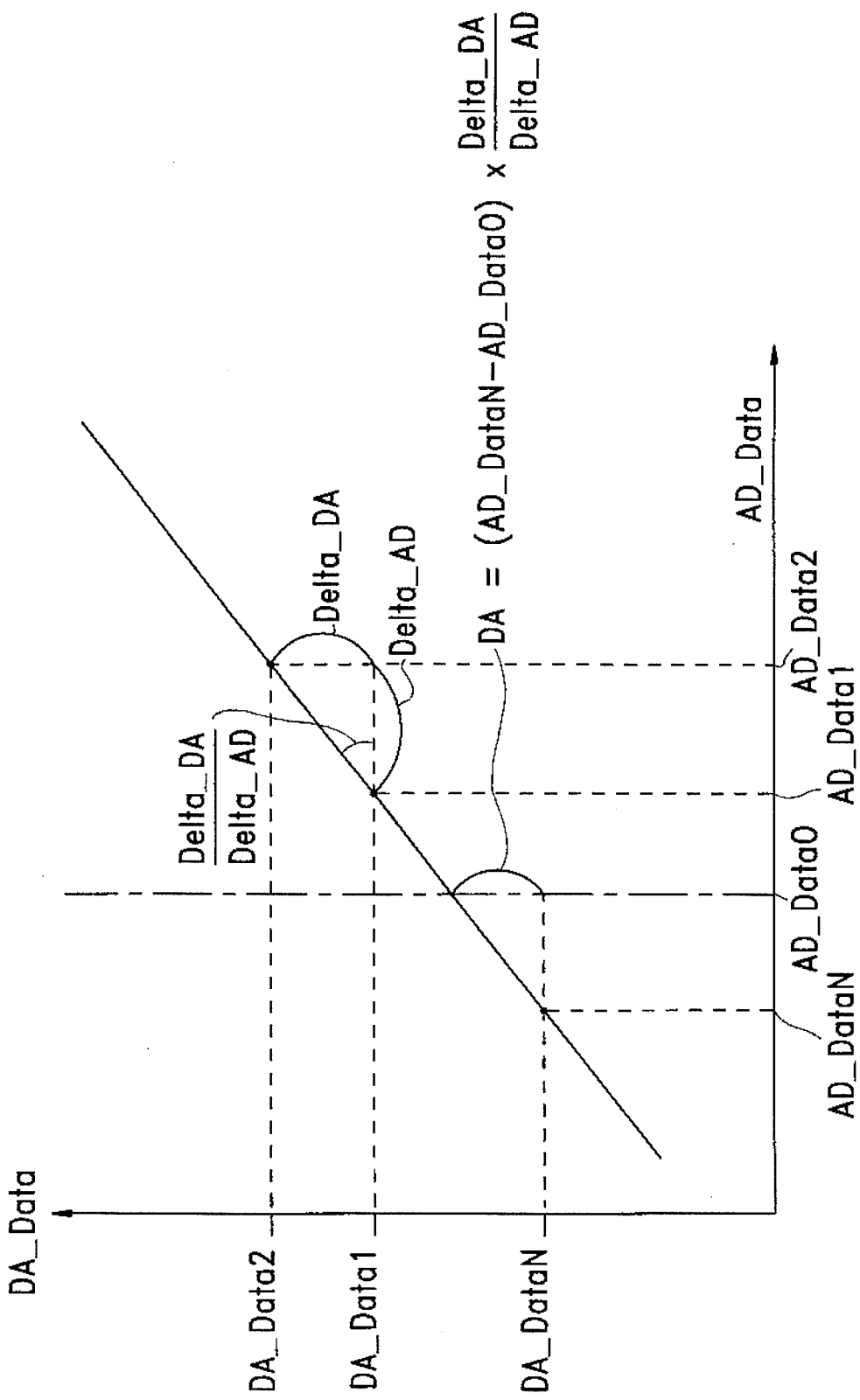
FIG. 2 is a graph for explaining the principle of obtaining a control signal in the digital servo system according to the present invention.

Referring to FIGS. 1 and 2, the concept of the present invention will be explained. In FIG. 1, a digital servo system 1 has a controlled portion 2 whose output terminal is connected to an analog-to-digital converter device (detecting portion) 3. The analog-to-digital converter device (hereinafter called "A/D converter device") 3 is connected to a CPU (operating portion) 4 by an I/O bus. The CPU 4 is connected to a RAM (random access memory) 6 and a ROM (read-only memory) 7 by an address/data bus. The CPU 4 is also connected to a digital-to-analog converter device (control portion) 8 by an I/O bus, and the digital-to-analog converter device (hereinafter called "D/A converter device") 8 is connected to the controlled portion 2.

Next, the operation of the system of FIG. 1 will be described with reference to FIG. 2.

The CPU 4 sets an arbitrary $DA_{13}$ Data 1 in the D/A converter device 8 (a D/A converter, PWM (pulse-width modulation), etc.). The D/A converter device 8 outputs a control signal corresponding to the DA_Data 1 to the controlled portion 2 to produce a controlled signal. The CPU 4 detects the controlled signal from the A/D converter device 3 and stores it as AD_Data 1 in the RAM 6.

Subsequently, the CPU 4 sets an arbitrary DA_Data 2 other than DA_Data 1 in the D/A converter device 8 and detects AD_Data 2 in the same way.

After completing the above operation once, the CPU 4 determines the ratio of the amount of change of the D/A converter device 8, Delta_DA, to the amount of change of the A/D converter device 3, Delta_AD, that is, Delta_DA/Delta_AD. In this case, a mean value of Delta_DA/Delta AD may be computed by detecting AD_Data 1 and AD_Data 2 corresponding to DA_Data 1 and DA_Data 2, respectively, several times. Furthermore, a mean value of Delta DA/Delta_AD may be computed by setting more than two values of DA_Data (DA_Data 1, DA_Data 2, DA_Data 3, . . . ) and detecting the respective values of AD_Data (AD_Data 1, AD_Data 2, AD_Data 3, . . . ).

The CPU 4 finds the difference between AD_Data N corresponding to the last set DA_Data N and the desired value AD_Data 0 of the controlled signal and computes an amount of change ΔDA to be outputted to the D/A converter device 8 for adjusting the difference, that is, ΔDA=(AD_Data N−AD_Data 0)×(Delta_DA/Delta_AD). The computed ΔDA is added to or subtracted from DA_Data N to obtain a controlled signal corresponding to the desired value AD_Data 0, thereby finishing the adjustment. The data inputted in or computed by the CPU 4, such as the controlled signal corresponding to AD_Data 0 as well as AD_Data, DA_Data, Delta_DA/Delta_AD, are stored in the RAM 6. A program for controlling the above operation is stored in the ROM 7.

In this fashion, the relative numerical relation between the control signal and the controlled signal is learned at the initial stage of adjustment and subsequently the control is made by using the learned relative relation so that it is possible to obtain directly from the amount of change of the controlled signal the relative amount for changing the control signal, thereby enabling a fast and efficient control.

Further, if the learning is made whenever the power is turned on or a predetermined time has past or the temperature has varied by predetermined degrees, then the secular variation, the variation of the controlled portion, the temperature change, etc., can be canceled by the control means, thereby allowing an efficient and stable control.

Figure 4:
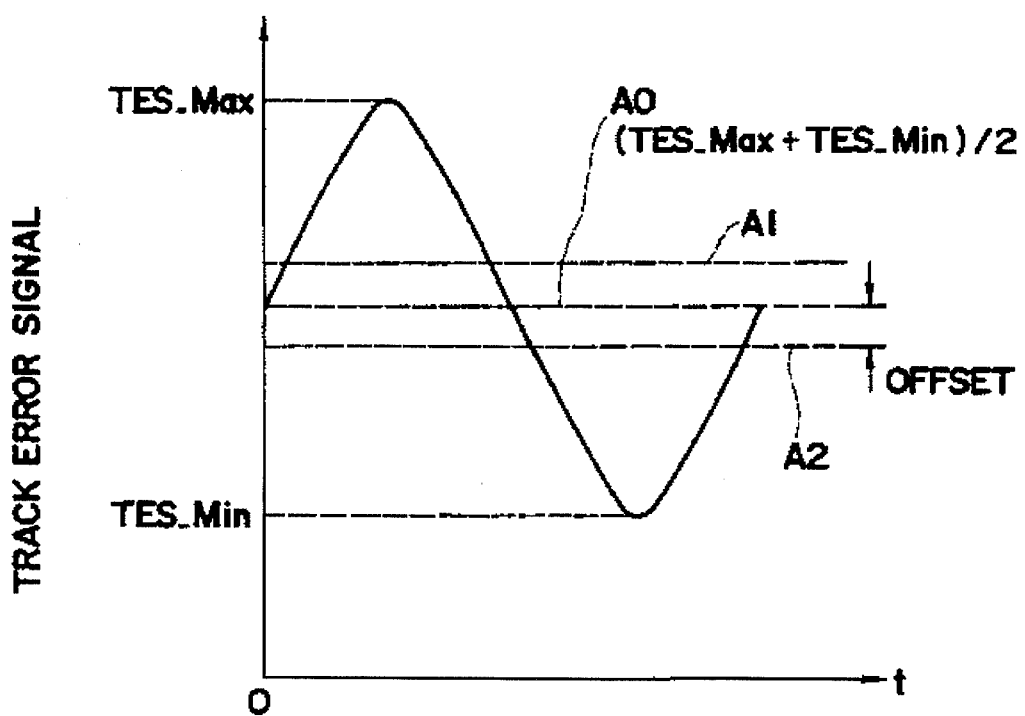
FIG. 4 is a graph showing the wave form of a track error signal of the first embodiment.
Figure 5:
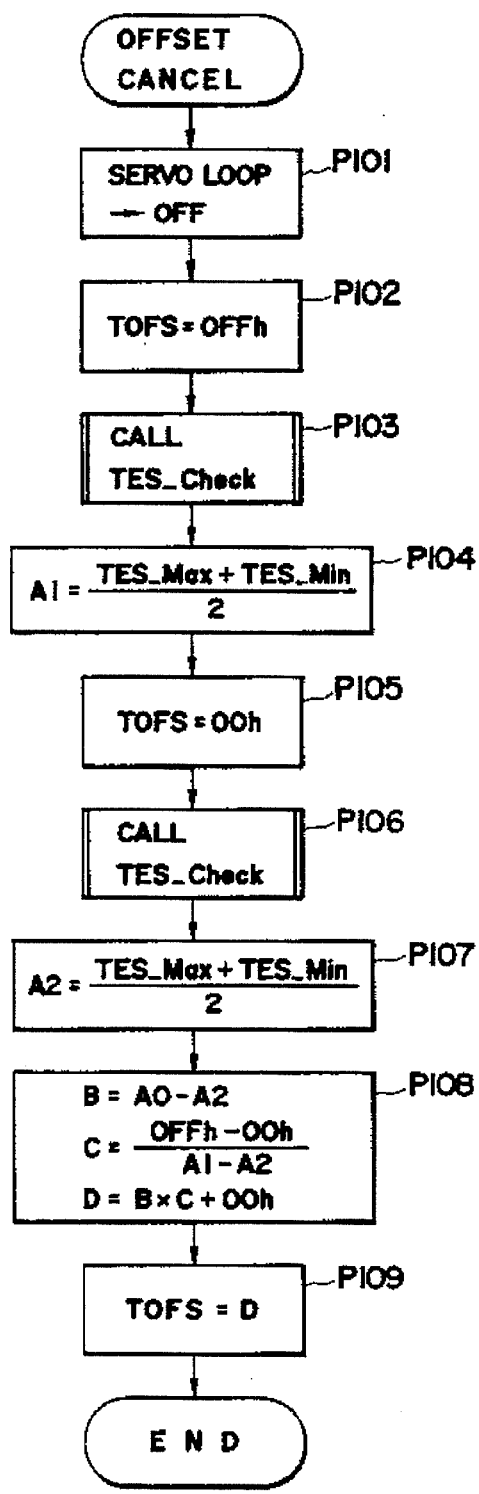
FIGS. 5(a) and 5(b) are flow charts for explaining the operation of the CPU of the first embodiment.
Figure 5:
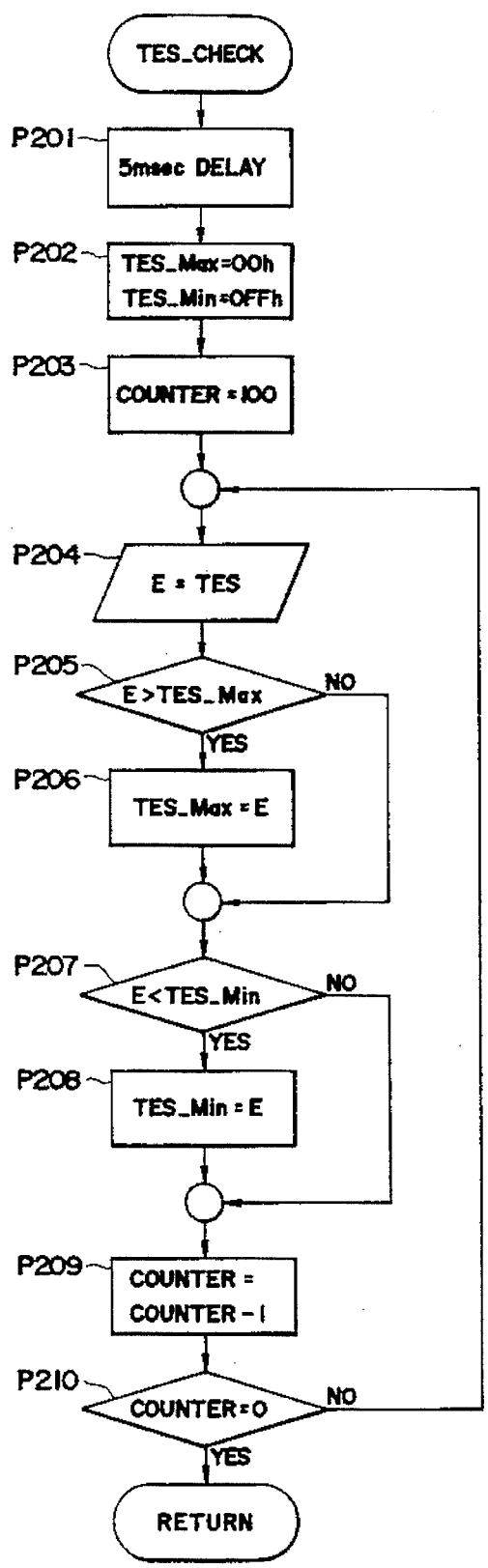

Next, as a first embodiment of the present invention, a tracking servo system shown in FIGS. 3 to 5 will be described.

Figure 3:
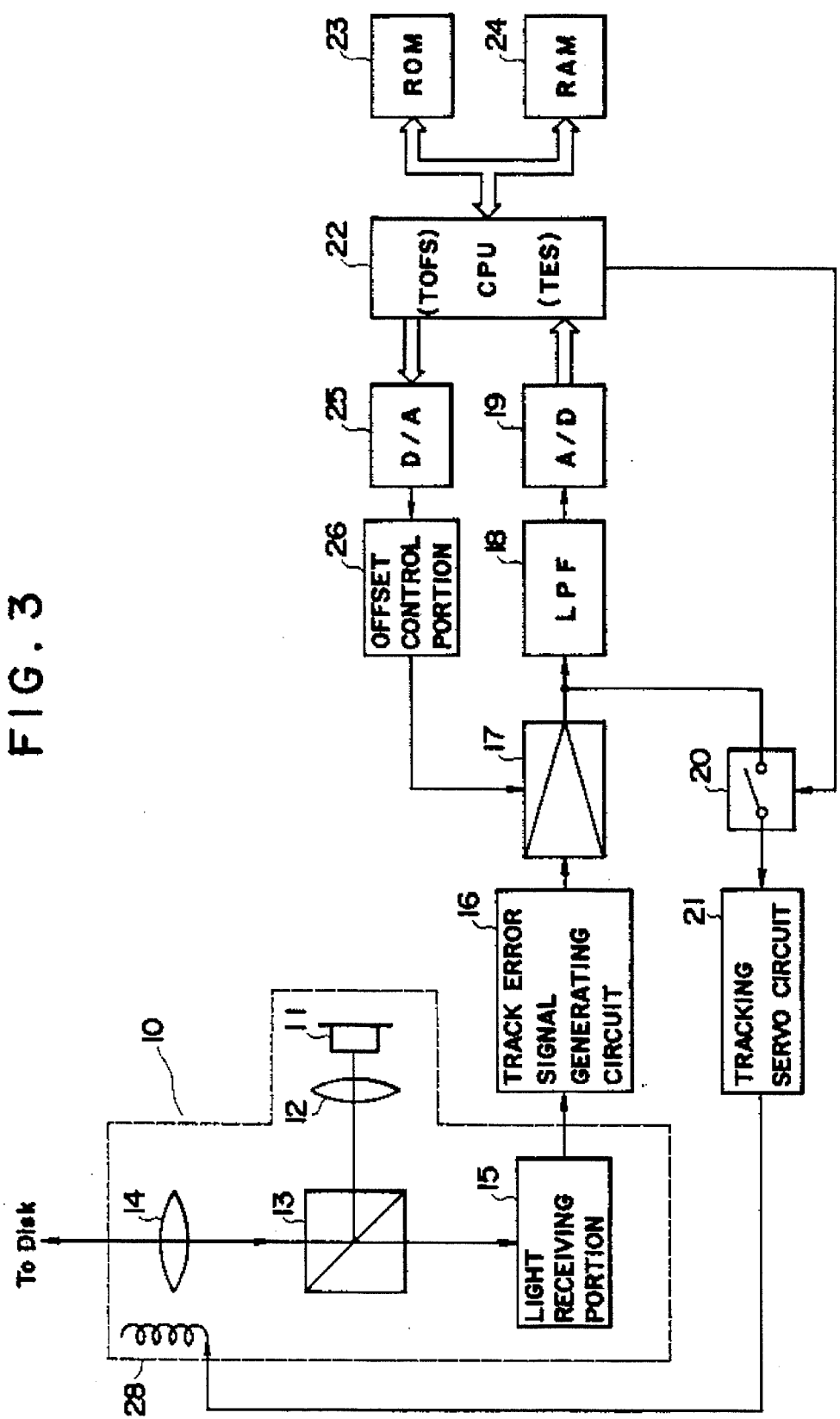
FIG. 3 is a block diagram of a tracking servo system according to a first embodiment of the present invention.

In FIG. 3, an optical pickup 10 is to record or reproduce information to or from a recording surface of an optical disk (not shown). A light beam 11 emitted from a laser diode 11 is made to be parallel rays by a collimator lens 12, reflected by a beam splitter 13, converged by an objective lens 14 and impinges on a recording surface of an optical disk. The light beam reflected from the recording surface of the optical disk passes through the objective lens 14 and the beam splitter 13 and is photoelectrically converted to an electric signal by a light receiving portion 15 formed by a photodiode, etc. A track error signal generating circuit 16 generates a track error signal TES on the basis of the electric signal. The generated track error signal TES is amplified by an offset adjusting amplifier 17 and branches: one part is supplied to an A/D converter 19 via a low pass filter 18 and the other part is applied to a tracking servo circuit 21 via a switch 20. When the switch 20 is closed, the output of the tracking servo circuit 21 is applied to a track actuator 28 for moving the objective lens 14 to make the light beam follow accurately a recording track on the recording surface. The track error signal TES digitally converted by the A/D converter 19 is inputted to a CPU 22. The CPU 22 is connected to a ROM 23 and a RAM 24 via a control bus, and a control program and data can be inputted and outputted. The switch 20 can be turned on and off by the CPU 22.

Corresponding to the obtained track error signal TES, the CPU 22 increases or decreases an output TOFS to an D/A converter 25 to adjust the amount of offset of the offset adjusting amplifier 17 via the D/A converter 25 and an offset control portion 26.

This is a control system for canceling the optical offset caused in the track error signal owing to the deviation of the optical member in the optical pickup 10, and the electric offset added to the output of each circuit in the tracking servo system. The light beam deviating from the recording track owing to the offset will follow the recording track precisely when the offset is removed.

Referring to FIGS. 5(a) and 5(b), the operation of the CPU 22 will be described.

FIG. 5(a) is a flow chart of the offset cancel operation of the servo loop. In step P101, the switch 20 is turned off to make the servo loop off. In step P102, the output TOFS to the D/A converter 25 is given the maximum value OFFh, and in step P103, a subroutine TES_CHECK shown in FIG. 5(b) is called. After a delay of 5 msec in step P201 of FIG. 5(b), TES_Max is given 00h and TES_Min is given 0FFh in step P202, and 100 is set in a counter in step P203. In step P204, E is defined to be the track error signal TES detected from the A/D converter 19. In step P205, E is compared with TES_Max set in step P202. If E is larger than TES_Max, the process proceeds to step P206; if E is smaller than TES_Max or equal to TES_Max, the process proceeds to step P207.

In step P206, TES_Max is made equal to E. In step P207, E is compared with TES_Min set in step P202. If E is smaller than TES_Min, the process proceeds to step P208; if E is larger than TES_Min or equal to TES_Min, the process proceeds to step P209.

In step P209, the number 1 is subtracted from the counter. In step P210, it is determined whether the number of the counter is zero. If it is zero, the process ends; if it is not zero, the process returns to step P204. With this counting operation, the maximum and minimum values of the track error signal TES within a predetermined time are obtained. As described above, in the routine TES_CHECK, the maximum value TES_Max and the minimum value TES_Min of the track error signal are determined by predetermined times of sampling.

Then, the process returns to step P104 to compute the mean value A1 of the determined TES_Max and TES_Min, that is, the center of the amplitude of the track error signal TES. In step P105, the output TOFS to the D/A converter 25 is given the minimum value 00h, and in step P106, the TES_CHECK is called again. In steps P201 to P210, the same operation as described above is performed to obtain TES_Max and TES_Min in the case of the output TOFS being minimum, and in step P107, the center value A2 of the amplitude is computed.

In step P108, the difference B between the preset desired center value A0 without offset and the computed center value A2, and the slope C of the amount of change of the output TOFS with respect to the amount of change of the center value A2 to the center value A1 are computed, and B multiplied by C is added to TOFS to obtain D which is the output TOFS necessary for reaching the desired center value A0.

The value D obtained in step P109 is set at the output TOFS and outputted to the D/A converter 25.

Next, the operation of this embodiment will be explained.

When the offset is corrected, the CPU 22 first opens the switch 20 to turn the servo loop off. Then, in accordance with the flow charts of FIGS. 5(a) and 5(b), the output TOFS is given the maximum value 0FFh and the minimum value 00h, and the track error signal TES including the offset is sampled during a time period preset by the counter provided in the CPU 22 to obtain the center values A1 and A2 of the amplitude of the track error signal TES, whereby the change of the output TOFS with respect to the change of the center value is determined. From the determined relation between TOFS and the center value of amplitude of TES, the output TOFS corresponding to the desired center value A0 without the offset is obtained and outputted to the offset control portion 26 via the D/A converter 25. The offset control portion 26 adjusts the offset of the offset adjusting amplifier 17 to cancel the offset.

Subsequently, the CPU 22 closes the switch 18 to turn the tracking servo loop on.

Although the maximum value 0FFh and the minimum value 00h are used as the D/A output for learning the relation between the D/A output and the A/D input in this embodiment, arbitrary values may be used.

If the precision of the learning is insufficient due to the bit-number relation between the D/A converter 25 and the A/D converter 10 or the like and the adjustment within a desired range cannot be performed, then the adjustment may be repeated several times by repeatedly determining the center of the amplitude of the signal TES and setting the control signal on the basis of the difference from the desired value A0, or fine adjustment may be made after the adjustment by increasing or decreasing the control signal by one or two bits.

If the A/D converter 17 is saturated when the maximum, minimum or any other value is set in the D/A converter 25 for learning, then the value of the D/A converter is shifted a little so that the learning can be made in an unsaturated range.

Next, referring to FIGS. 6 to 8, a second embodiment of the present invention will be described. In this embodiment, the present invention is applied to a system for adjusting laser beam emission power.

Figure 6:
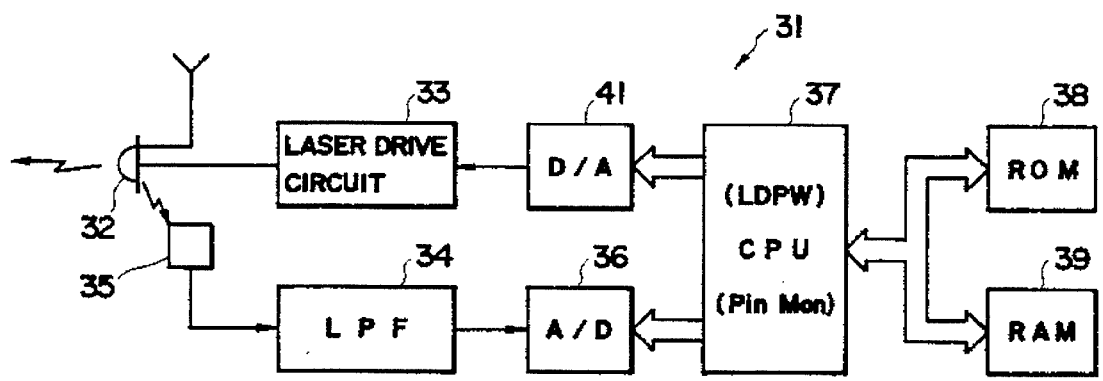
FIG. 6 is a block diagram of a laser beam emission power adjusting apparatus according to a second embodiment of the present invention.

In FIG. 6, a laser beam emission power adjusting system 31 has a semiconductor laser 32. The semiconductor laser 32 is controlled by a laser drive circuit 33. Since the semiconductor laser 32 emits light beams forward and backward, the amount of beam emission can be monitored by detecting the backward light with a light detector 35 such as a photodiode. A laser beam emission monitor signal Pin Mon of the semiconductor laser 32 is detected by a CPU 37 via a low pass filter 34 and an A/D converter 36. The CPU 37 is connected to a ROM 38 and a RAM 39 via a control bus. In accordance with the obtained laser beam emission monitor signal Pin Mon, the CPU 37 increases or decreases a laser beam emission adjusting output LDPW and transmits it to the laser drive circuit 33 via a D/A converter 41 to adjust the laser beam emission.

Figure 7:
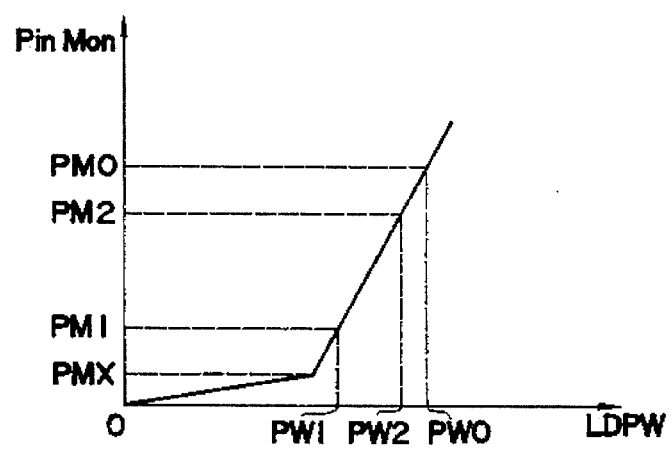
FIG. 7 is a graph for explaining the relation between the output of a digital-to-analog converter and the input of an analog-to-digital converter of the second embodiment.
Figure 8:
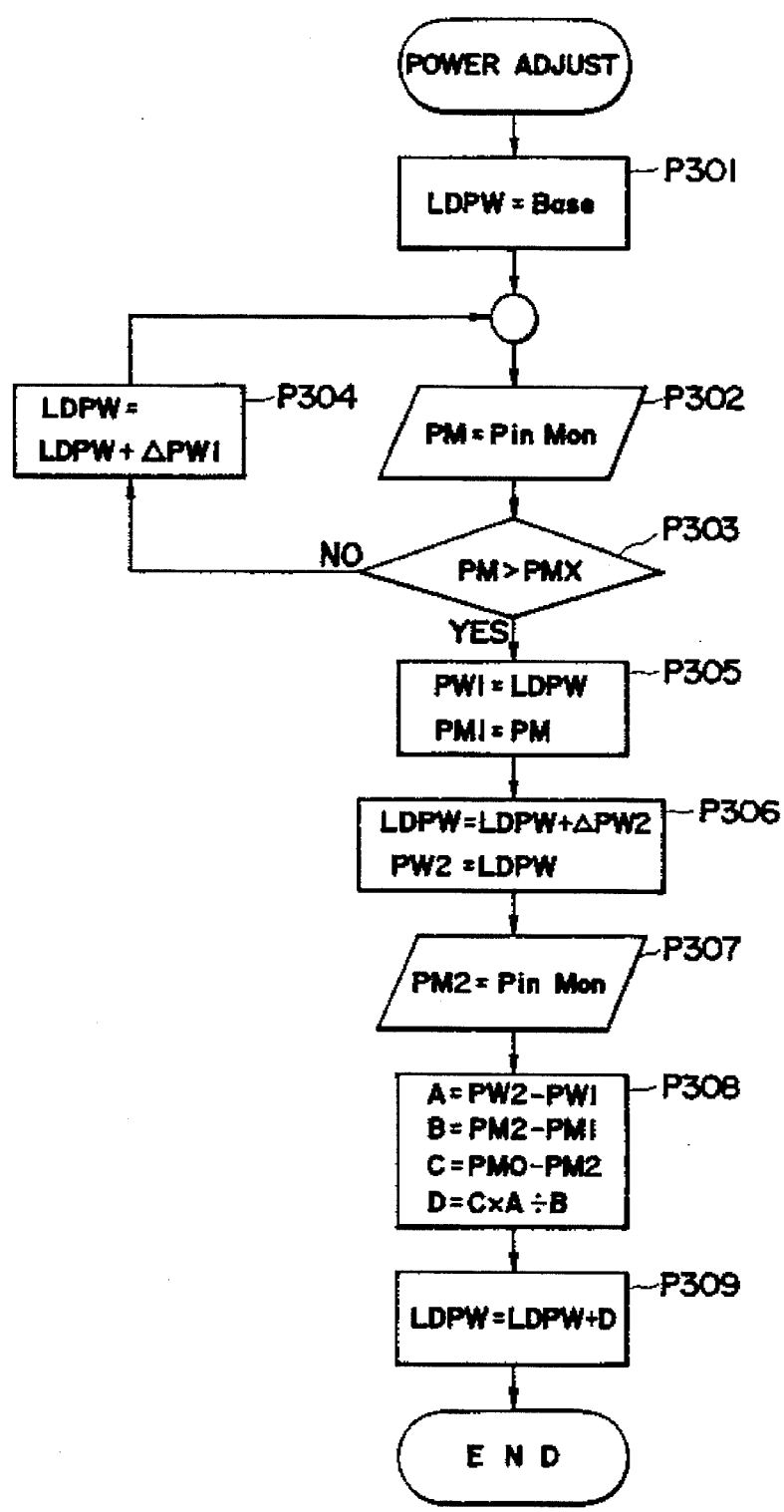
FIG. 8 is a flow chart for explaining the operation of a CPU of the second embodiment.

Referring to FIGS. 7 and 8, the operation of the CPU 37 will be explained.

In step P301, the laser beam emission adjusting output LDPW is given a base current Base in order to make the semiconductor laser 32 emit light with a current larger than the threshold current. In step P302, the laser beam emission monitor signal Pin Mon is detected and PM is defined to be Pin Mon. In step P303, PM is compared with PMX, the regular Pin Mon value corresponding to the threshold current value. If it is smaller than PMX, the process proceeds to step P304; if it is larger than PMX, the process goes to step P305. In step P304, LDPW is increased by an arbitrary value ΔPW1 and the process returns to step P302 to sample Pin Mon again. In step P305, LDPW and PM are stored as PW1 and PM1, respectively.

In step P306, LDPW increased by an arbitrary value ΔPW2 is stored as PW2. In step P307, PW2 is set in the D/A converter 41, and Pin Mon in the case of PW2 is sampled and stored as PM2.

In step P308, the amount of change of LDPW necessary to reach the desired value PM0 of the laser beam emission monitor signal Pin Mon is computed. That is, the difference A between PW1 and PW2, the difference B between PM1 and PM2, and the difference C between PM0 and PM2 are found out, and the amount of change D of LDPW is obtained by computing D=(C×A)/B.

In step P309, the obtained amount of change D is added to LDPW to obtain the LDPW corresponding to the desired value PM0 thereby ending the operation. The functions of the ROM 38 and the RAM 39 are the same as those of the ROM and RAM in FIGS. 1 and 3.

Next, the operation of this embodiment will be described.

In accordance with the flow chart of FIG. 8, the CPU 37 causes the laser drive circuit 33 to supply currents PW1 and PW2 larger than the threshold current to the semiconductor laser 32 and finds the relation between the laser beam emission adjusting output LDPW and the laser beam emission monitoring signal Pin Mon. The CPU 37 determines the LDPW corresponding to the desired value PM0 on the basis of the found relation and outputs it to the laser drive circuit 33 via the D/A converter 41, whereby the semiconductor laser 32 emits a desired amount of light beam.

In an optical recording and reproducing apparatus, a semiconductor laser is used for the recording and reproducing of information, as shown in FIG. 3. The output of the semiconductor laser is controlled by changing over between the power for recording and the power for reproducing. The power for recording is larger than the power for reproducing.

If the power for reproducing and the power for recording are adjusted by using different D/A converters, the relation between the D/A output and the A/D input obtained with the power for reproducing may be used for adjustment, thereby saving the time for learning.

If the precision of the learning is insufficient due to the bit-number relation between the D/A converter 41 and the A/D converter 36 or the like and the adjustment within a desired range cannot be performed, then coarse adjustment may be repeated several times, or fine adjustment may be made after the coarse adjustment by varying LDPW by one or several bits.

In the above embodiments, at least two cycles of learning and one adjusting operation are sufficient to end the process, so that the adjusting time can be saved and equalized in comparison with a method of adjustment by increasing or decreasing the D/A output by several bits, or the like.

Further, if the relation between the D/A output and the A/D input is stored in a ROM beforehand, the capacity of the ROM must be enlarged in proportion as the precision of the D/A output and the A/D input is enhanced. According to the present invention, however, it is sufficient to store only the relation between the D/A output and the A/D input, and the same program can be used for adjustment irrespective of the precision; the higher the precision of the D/A output and the A/D input is, the more efficiently the system can be adjusted.

Moreover, if the learning is made whenever the power is turned on or a predetermined time has past or the temperature has varied by predetermined degrees, then it is not necessary to take the secular variation into account, and if the learning is made whenever a predetermined time has past, then it is also not necessary to consider the temperature characteristics. Additionally, since every system performs its own learning, even if the respective systems have some variation, its influence on the servo system can be removed.

Not only in the initial adjustment, but also in the fine adjustment after the initial adjustment, an efficient adjustment can be made by using the results of learning.

In the first and second embodiments, the relation with the controlled portion varies linearly, so that an accurate control can be effectuated by measuring two points only. Even if the relation is not strictly linear, but generally linear, it is possible to make an approximate control in accordance with the embodiments.

As explained above, the digital servo system according to the present invention comprises an operating portion for determining and storing a relation between a control signal and a controlled signal and outputting the control signal on the basis of the determined relation, whereby the system can cancel the variation, temperature characteristics, secular variation, etc., of the controlled signal and make a fast and stable control.

What is claimed is:

1. A digital servo system for obtaining by calculation a control signal corresponding to a target value of control on the basis of a change of the control signal and a change of a controlled signal, the system comprising:

control means for outputting the control signal;

digital-to-analog converting means for effectuating digital-to-analog conversion of the control signal from the control means and outputting a converted control signal;

controlled means, to be controlled by inputting the converted control signal from the digital-to-analog converting means, for outputting the controlled signal representing a state of the controlled means controlled by the inputted converted control signal; and analog-to-digital converting means for effectuating analog-to-digital conversion of the controlled signal and outputting a converted controlled signal;

the control means receiving the converted controlled signal from the analog-to-digital converting means and outputting the control signal;

the control means comprising:

signal detecting means for detecting at least two instances of the converted controlled signal obtained from the analog-to-digital converting means by sequentially outputting at least two different instances of the control signal to the digital-to-analog converting means;

learning means for obtaining a first difference, Delta_DA, between the at least two instances of the control signal and a second difference, Delta_AD, between the at least two instances of the converted controlled signal detected by the signal detecting means, and obtaining a relation between the control signal and the controlled signal by calculating Delta_DA/Delta_AD, the relation between the control signal and the controlled signal being a linear relation; and target control signal calculating means for calculating a value of the control signal corresponding to a predetermined value of the controlled signal which is the target value of control of the servo system as a function of the predetermined value of the controlled signal, the relation between the control signal and the controlled signal obtained by the learning means, and the value of one of the at least two instances of the converted controlled signal.

2. The system of claim 1, in which the controlled means comprises a beam pickup for emitting a light beam on an optical recording medium to record and/or reproduce information, and tracking servo means for controlling the light beam following a recording track of the optical recording medium.

3. The system of claim 2, in which the control signal is an offset adjusting signal of the tracking servo, and the controlled signal is a track error signal produced by the tracking servo means to represent a positional difference between the light beam and the recording track of the optical recording medium.

4. The system of claim 2, in which the loop of the tracking servo means is open while the controlled signal is being detected to be used for determining the relation between the control signal and the controlled signal.

5. The system of claim 3, in which the control means determines the center value of the positive and negative peak values of the track error signal and obtains the relation between the center value and the offset adjusting signal of the tracking servo.

6. The system of claim 5, in which the positive and negative peak values of the track error signal is the maximum and minimum values of the peak values during a predetermined time period, respectively.

7. The system of claim 1, in which the controlled means comprises a light source; light source driving means for supplying a driving current to the light source; and light detecting means for detecting the output of the light source.

8. The system of claim 7, in which the light source is a semiconductor laser.

9. The system of claim 7, in which the controlled signal is outputted from the light detecting means, and the control signal is the driving signal supplied to the light source.

10. The system of claim 8, in which the control signal corresponds to the threshold current of the semiconductor laser.

* * * * *